United States Patent
Amir

(10) Patent No.: US 12,262,755 B1
(45) Date of Patent: Apr. 1, 2025

(54) METHOD OF MAKING CIRCUIT WITH BYPASS LINE THAT BYPASSES INTERNAL CIRCUITRY

(71) Applicant: Altria Client Services LLC, Richmond, VA (US)

(72) Inventor: Nehemia Amir, Shoham (IL)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/411,727

(22) Filed: Jan. 12, 2024

Related U.S. Application Data

(62) Division of application No. 14/336,261, filed on Jul. 21, 2014, now Pat. No. 11,901,747.

(60) Provisional application No. 61/857,495, filed on Jul. 23, 2013.

(51) Int. Cl.
| | |
|---|---|
| *A24F 40/90* | (2020.01) |
| *A24F 40/10* | (2020.01) |
| *A24F 40/42* | (2020.01) |
| *A24F 40/53* | (2020.01) |
| *H02J 7/00* | (2006.01) |

(52) U.S. Cl.
CPC ............. *A24F 40/90* (2020.01); *A24F 40/10* (2020.01); *A24F 40/42* (2020.01); *A24F 40/53* (2020.01); *H02J 7/0047* (2013.01); *H02J 7/0063* (2013.01); *H02J 7/00712* (2020.01)

(58) Field of Classification Search
None
See application file for complete search history.

(56) References Cited

U.S. PATENT DOCUMENTS

| | | | |
|---|---|---|---|
| 5,504,416 | A | 4/1996 | Holloway et al. |
| 5,670,863 | A | 9/1997 | Broell et al. |
| 5,703,467 | A | 12/1997 | Patino |
| 5,861,730 | A | 1/1999 | Lee |
| 2008/0092912 | A1 | 4/2008 | Robinson et al. |
| 2008/0238357 | A1 | 10/2008 | Bourilkov et al. |

(Continued)

FOREIGN PATENT DOCUMENTS

| | | |
|---|---|---|
| DE | 36 37 669 A1 | 5/1988 |
| EP | 1 538724 A2 | 6/2005 |

(Continued)

OTHER PUBLICATIONS

Partial International Search Report mailed on Mar. 16, 2015.
International Search Report and Written Opinion mailed on Jul. 23, 2015.

*Primary Examiner* — Phu H Nguyen
(74) *Attorney, Agent, or Firm* — Harness, Dickey & Pierce, P.L.C.

(57) ABSTRACT

The method includes operatively connecting an internal circuitry to a first battery to assist in charging the first battery, the first battery having a first terminal and a second terminal, electrically connecting a pair of connectors to the e-vaping device, electrically connecting a diode to the first terminal and a first connector, of the pair of connectors, the diode being in a bypass line that bypasses the internal circuitry, and configuring a controller to measure a first measured voltage at the pair of connectors during an application of a first current, the first current being high enough that the first current passes through the diode and being low enough that the first current does not activate the internal circuitry, and determine a voltage of the first battery based on the first measured voltage.

16 Claims, 7 Drawing Sheets

(56) References Cited

U.S. PATENT DOCUMENTS

| | | |
|---|---|---|
| 2010/0253284 A1 | 10/2010 | Aoki et al. |
| 2013/0087160 A1 | 4/2013 | Gherghe |
| 2015/0020831 A1 | 1/2015 | Weigensberg et al. |

FOREIGN PATENT DOCUMENTS

| | | |
|---|---|---|
| WO | WO-2008/117239 A2 | 10/2008 |
| WO | WO-2012/009652 A2 | 1/2012 |
| WO | WO-2013/093695 A1 | 6/2013 |

METHOD OF MAKING CIRCUIT WITH BYPASS LINE THAT BYPASSES INTERNAL CIRCUITRY

CROSS-REFERENCE TO RELATED APPLICATIONS

This application is a divisional of U.S. patent application Ser. No. 14/336,261, filed Jul. 21, 2014, which claims the benefit of the filing date of U.S. Provisional Patent Application No. 61/857,495 filed Jul. 23, 2013, the disclosures of each of which are hereby incorporated herein by reference.

BACKGROUND

An electronic cigarette ("e-cigarette" or "e-Cig") is a device that emulates tobacco cigarette smoking, by producing smoke replacement that may be similar in its physical sensation, general appearance, and sometimes flavor (i.e., with tobacco fragrance, menthol taste, added nicotine etc.). The device may use heat, ultrasonic energy, or other means to vaporize a liquid solution (for example based on propylene glycol, or glycerin, for example including taste and fragrance ingredients) into an aerosol mist. The vaporization may be similar to nebulizer or humidifier vaporizing solutions for inhalation. The generated mist may be sensed similar to cigarette smoke.

An e-Cig includes a battery for providing power/heat for the vaporization process. The e-Cig may include a connector for charging the battery from an external charger. However, the charger may not be compatible with all types of e-Cig batteries and all types of connectors.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
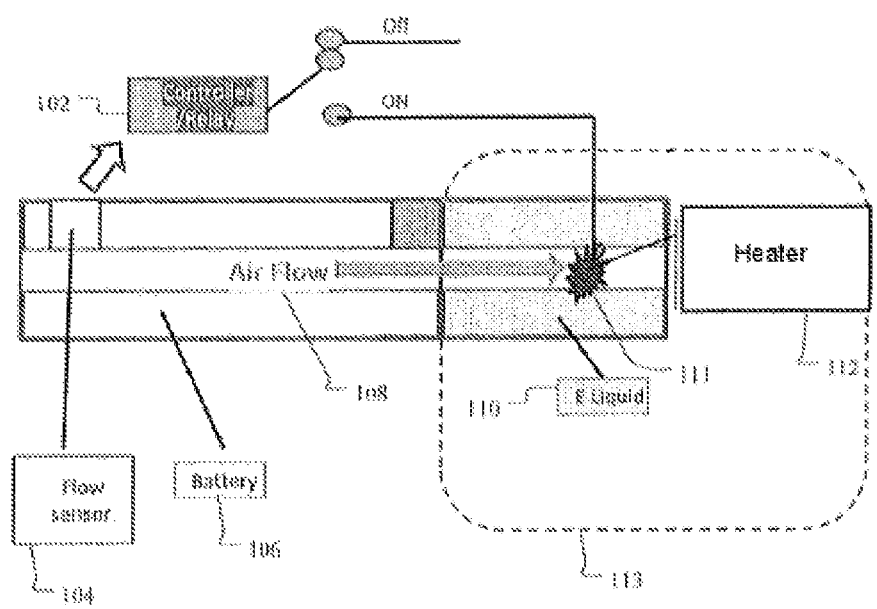
FIG. 1 is a diagram of an electronic cigarette.

The system and method described herein may improve the charging process for an e-Cig. E-Cig chargers that rely on only the internal circuit for charging may limit the charging current for safety reasons, and may have longer charging times. Improper estimates of the internal battery voltage according to the connector voltage may also allow for over charging or may inefficiently charge the battery at less than the specified voltage. An e-Cig charger that measures the battery voltage from the connectors may be more accurate.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, an improvement to an electronic cigarette ("e-Cig") may include improved charging of the battery. A more accurate battery voltage can be detected from the connections with the charger that can provide for an optimized evaluation of the charging process. Various battery properties (e.g. battery type) may be detected based on resistance measurements from within the e-Cig. The battery charging can then be controlled and optimized based on a slow control of the current and voltage.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

FIG. 1 is a diagram of an electronic cigarette. The "smoke" produced by an e-Cig is a created by turning a liquid (e-Liquid 110) into mist and some vapor with a heater 112. The cartomizer 113 may include the heater 112 and the e-liquid 110. The cartomizer 113 may also be referred to as a cartridge throughout this disclosure and may be disposable. The e-liquid 110 may have a high viscosity at room temperature to enable longer shelf life and reduce leakages; however, this high viscosity may reduce the vaporization rate. The e-Liquid 110 is vaporized via air flow 108, generated by the inhalation of the user (i.e. the smoker or consumer or vapor), which produces a pressure difference that removes e-Liquid droplets from the e-Liquid 110. In one embodiment, the e-Liquid 110 may be soaked in a wick in contact with the heater. In order to reduce the e-Liquid viscosity, to a level enabling vaporization, external heat may be applied through a heating element 111 as further described below. In this embodiment, local viscosity reduction via heating, while inhalation occurs, enables e-Liquid vaporization in the inhalation-generated flow of air 108. The e-Liquid 110 may be heated via an electric current flowing through the heating element 111 and may then be vaporized and evaporated through the e-Cig and may contain tastes and aromas that create a smoking sensation. The controller 102 may be activated due to air flow 108 (from the inhaled air) passing a flow sensor 104. The sensor 104 may be activated by a pressure drop across the sensor and may directly switch the battery 106 power on, or be used as an input for the controller 102 that then switches the battery 106 current on. Although illustrated as separate from the e-Cig, the controller 102 may be a part of the e-Cig (e.g. along with the battery 106). The battery 106 may be a separate/removable assembly. The battery 106 may include one or more electronic chips controlling and communicating from it. It may connect with the cartomizer 113, which can be replaced or changed (e.g. when a new/different e-Liquid 110 is desired).

The e-Cig may include two parts. The first part is often just referred to as the battery or battery portion (i.e. battery enclosure) and it includes the battery, the air flow sensor and the controller. The second part is the cartridge (i.e. cartomizer 113) that is filled up with liquid and flavors for smoke and flavor generation. The battery portion and the cartridge may be connected by metal connectors. An airflow tube of the battery enclosure and an airflow tube of the cartridge may enable the smoker to puff through the electronic cigarette and activate the airflow sensor inside the battery portion. This may trigger the controller to cause the heating coil inside the cartridge to get hot, evaporate the liquid that is in the cartridge and generate smoke (i.e. vapor). Although not shown in FIG. 1, the e-Cig may include connections (i.e. connectors or electrical connections) that are used for power delivery to the heating element 111 and for charging the battery 106.

Figure 2:
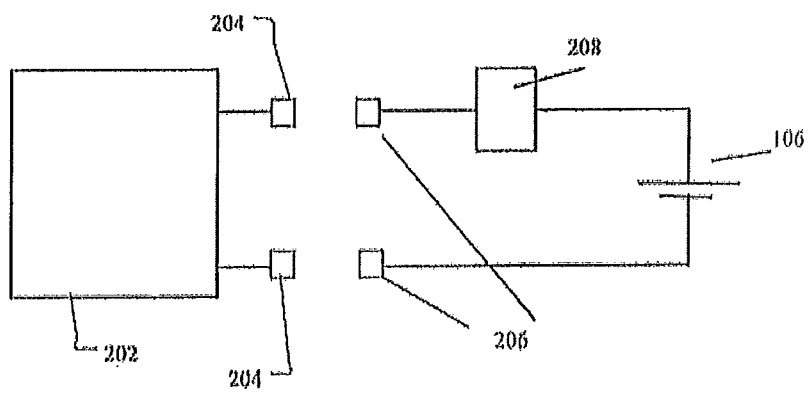
FIG. 2 is another diagram of an electronic cigarette with an external charger.

FIG. 2 is a partial diagram of an electronic cigarette, which describes the charging circuit, with a charger 202, which may be an external charger or an internal charger. The e-Cig includes connections for power delivery to the heating element 111 and for charging the battery 106. The charger 202 may be an external universal serial bus ("USB") device that plugs into a wall outlet or a USB drive of a computer for supplying power. As described, the charger 202 may support different types of batteries and by supplying the optimal charging parameters for all types of e-Cigs and all types of batteries.

In one embodiment, there may be two electrical connections 206 on one end of the e-Cig for connecting with the electrical connections 204 of the charger 202. The e-Cig may include various electronic components 208 that utilize power from the battery 106 and may rely on the charge received. Previously, e-Cigs may have relied on circuitry in the electronics 208 for charging, which may have been inefficient. As described below, the charging may be optimized for efficiency for different types of e-Cigs and different types of batteries. Using optimal charging parameters may ensure longer battery capacity, longer battery life and a shorter charging time.

Figure 3:
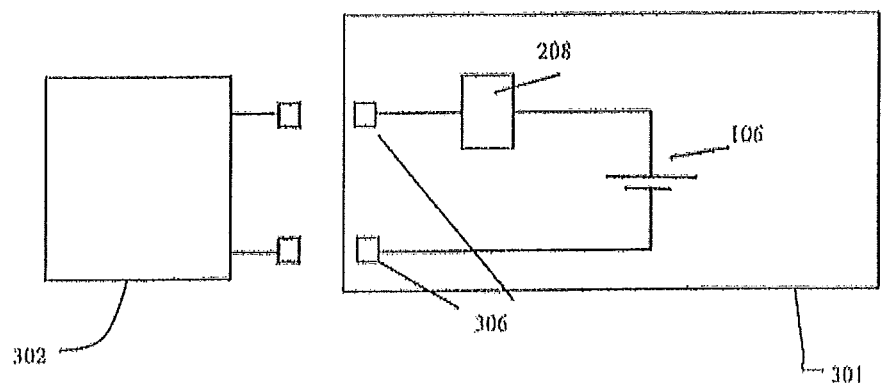
FIG. 3 is another diagram of an electronic cigarette with a charger.

FIG. 3 is another diagram of an electronic cigarette charging circuit with a charger 302 that is similar to FIG. 2. In particular, FIG. 3 illustrates the electronic schematics of the charger connected to the e-Cig. The charger 302 is connected to the e-Cig 301 through the connector(s) 306. The internal electronics 208 of the e-Cig 301 may be located between the connection of the charger 302 to the battery 106. The internal electronics 208 are further described below with respect to FIG. 4.

Figure 4:
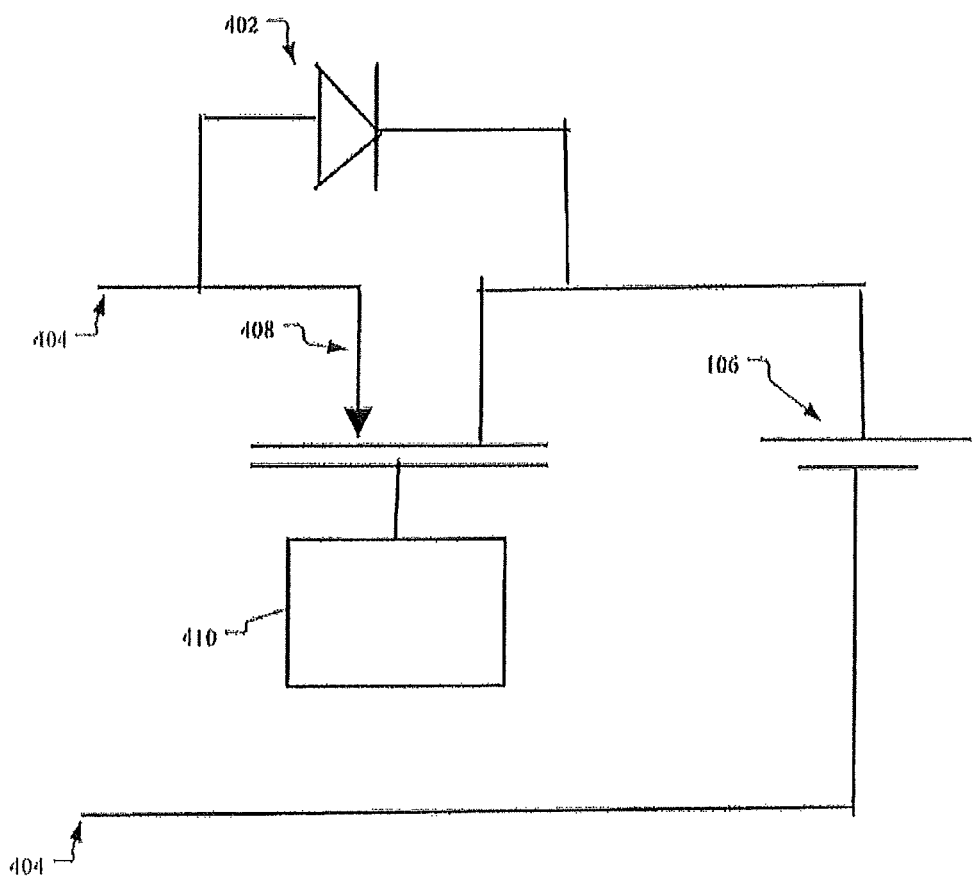
FIG. 4 is a diagram of the electronics for charging in the electronic cigarette.
Figure 5:
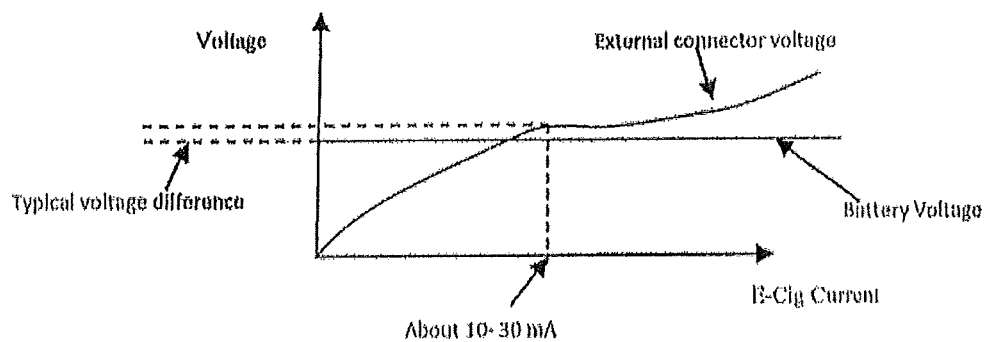
FIG. 5 is an illustration of the voltage difference between the cigarette connector and the battery voltage that is dependent on the charging current.

FIG. 4 is a diagram of the electronics 208 for charging the electronic cigarette. The measurement of the battery 106 voltage may be performed by setting the charging current of the charger 302 to a value that allows minimum current through the diode 402. After setting of the current to a specified minimum current, the voltage over the external connections 404 (or 306) may be read and the typical diode forward voltage is reduced. The diode's forward voltage may also be dependent on environmental temperatures, but this effect may be very small in low current situations and may be neglected. Since different e-Cigs may have different electronics, the type and the characteristics of the cigarette electronics should be known. The electronics 410 represent the internal electronic cigarette charging circuit that may be provided with power through line 408. The electronics 410 are not active when applying a very small current through the external connections 404, and therefore do not interfere with the battery voltage detection according to this embodiment. The detection of the battery voltage may be accomplished by applying a small current to the battery leads. This small current may work on the internal electronics FET transistor and switch it on. Because of the small current, a very small voltage is applied to the FET and the battery voltage can be measured on the external e-Cig connections. The amount of voltage that is applied to the FET pins may be different between different electronic designs, but with the same electronic design, the variation may be small under a controlled current, and is about $1/100^{th}$ of a volt, in one embodiment. FIG. 5 is an illustration of the voltage difference between the cigarette connector and the battery voltage that is dependent on the charging current.

Figure 6:
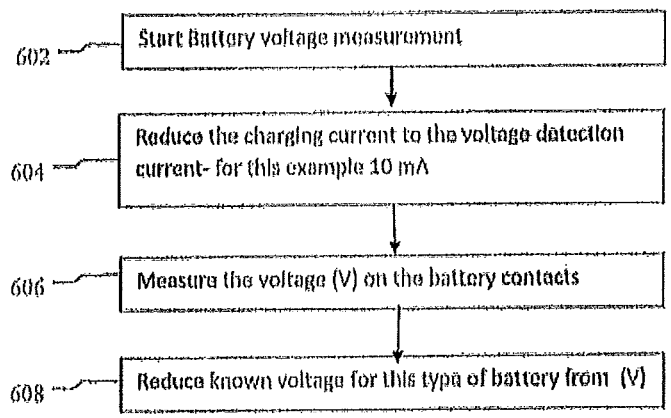
FIG. 6 is a flow chart of the voltage measurement process.

FIG. 6 is a flow chart of the voltage detecting process. In particular, FIG. 6 describes the battery voltage (V) measurement from external connections according to an algorithm of one embodiment. In block 602, the battery voltage measurement is started. In block 604, the charging current is reduced to the voltage detection current. In block 606, the voltage (V) is measured at the battery contacts. In block 608, the know voltage for the type of battery is reduced for the measured voltage (V).

Figure 7:
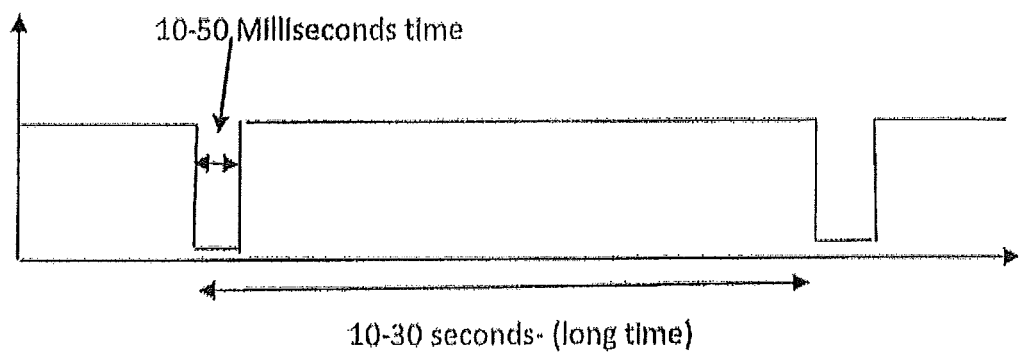
FIG. 7 is a diagram of battery current during charging.

FIG. 7 is a diagram of battery voltage measurement. In particular, FIG. 7 illustrates the charging current behavior during battery voltage measurement according to an algorithm of one embodiment. As illustrated, the internal e-Cig battery voltage is tested periodically, by reducing the charging current for short time (usually 10-50 milliseconds) to a small, constant current. During this time, the e-Cig voltage on the connections (e.g. external connections) 206/306 is measured by the e-Cig controller. The known amount of forward voltage on the diode 402 is subtracted from the measurement, and the result is the internal e-Cig battery voltage.

As described above, the battery voltage may be accurately detected for improved charging. In particular, an accurate battery voltage may be detected behind an Application-specific integrated circuit (ASIC) or internal electronics of the e-Cig 208. Accordingly, one embodiment includes accurately measuring the voltage at the connections. In an alternative embodiment, other battery properties may be detected. For example, battery capacity (which may be dependent on e-Cig length) may have different charging properties (e.g. different current).

In this embodiment, the type of battery or the type of internal e-Cig electronics may be detected by resistance measurements on the e-Cig electronic connection. For example, the charger connects a known voltage through a known resistance and measures the e-Cig typical resistance before the charging starts. This can set the charging parameters for calibrating optimal charging for a specific e-Cig. The typical resistance can influence the maximum charging current, the charging time and supply information to the charger about the cigarette's electronic circuitry.

The embodiment described herein utilizes resistance measurements for detecting e-Cig information. Exemplary e-Cig information/properties that may be detected by the charger based on resistance may include: 1) the electronic circuit type; 2) model; 3) internal FET voltage; 4) battery type; 5) battery charging current; and 6) detecting the e-Cig electronics. Each e-Cig's electronic circuits may have its own specified resistance by the manufacture. Measuring this resistance may allow for detection of the battery electronics.

Detecting the battery type may be useful, since smaller batteries may be charged with lower charging current according to the manufacturer instructions. Because a common e-Cig is divided into two lengths, short and long, there may be at least two different types of battery designs. Adding a parallel resistor to the known e-Cig resistance can provide the short/long cigarette information to the charger based on that resistance measurement.

Figure 8:
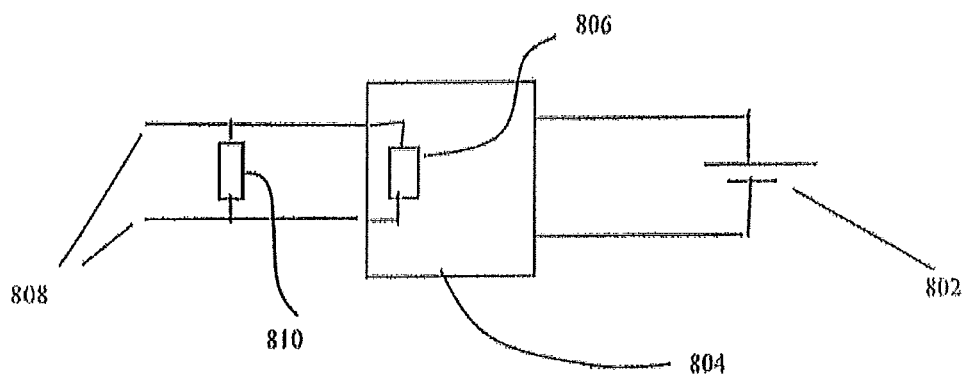
FIG. 8 is a diagram illustrating battery identification.

FIG. 8 is a diagram illustrating battery identification. In particular, FIG. 8 describes part of the internal battery electronic schema that is connected to the charger. The battery 802 is shown as an internal battery. The e-Cig may further include e-Cig electronics 804. A resistor 806 is representative of the equivalent resistance of the battery from the external connections 808. Another resistor 810 may be used for identifying the battery or for identifying information/properties, discussed above.

Optimal battery charging may include contiguous control over the battery voltage and the battery current. Because of the structure of different e-Cigs, it may not be possible to directly detect the battery voltage during charging, and therefore an external detection system may be utilized. During the detection process, there may be no charging of the battery and therefore the detection action itself can increase the charging time. Also, with the indirect detection method, continuous control is difficult. In another battery charging embodiment, optimal charging may be performed with indirect battery voltage detection that minimizes overhead time.

Chargeable batteries can have two stages for charging. The first stage may be called constant current. In this stage, the charging current is limited by the battery manufacture. If the charger knows the battery type, then the charger can act as current limiter during the first stage of charging. The second stage of charging may provide constant voltage. In this stage, the charger keeps the battery voltage within predetermined limits that are recommended by the battery manufacturer, while also controlling the charging current.

Implementation of the constant current restrictions and set up may be easy when the type of battery is known, and expressed in a current limitation by the charger. Providing constant voltage by the charger may include continuously measuring the charging current, and measuring the battery voltage on a periodic basis (e.g. 30 seconds). If the battery voltage, during the charging, exceeds the maximum allowed voltage, or if the measured charging current falls below a specific value, this may be an indication to the charger that it is time to move to the constant voltage control of the second stage. The charger reduces the charging current to a value that is below the charging current at the time of measurements, and increases the rate of measuring battery voltage. The charger continues with the above process until the charging current reaches the current that is specified by the battery manufacture as indicating a full charge, and stops charging. This may be very close to optimal charging by slow control (e.g. see FIG. 10 below).

Figure 9:
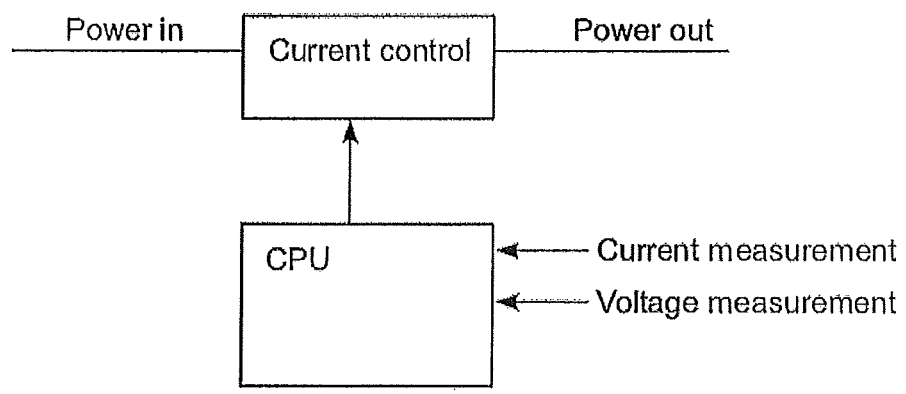
FIG. 9 illustrates a charger implementation block diagram.

FIG. 9 illustrates a charger implementation. "Power in" represents the input voltage to the charger (e.g. a wall-adaptor), and "Power out" represents the output to the e-Cig for charging. "Current control" represents an electronic circuit that controls current to "Power out", by the control of the central processing unit (CPU), which is a controller. The controller receives input information from the analog current and voltage measurement circuits on the e-Cig connector. In another embodiment, the same charging characteristics may be achieved by replacing the current control block with different types of controls but according to the same slow control algorithm.

Figure 10:
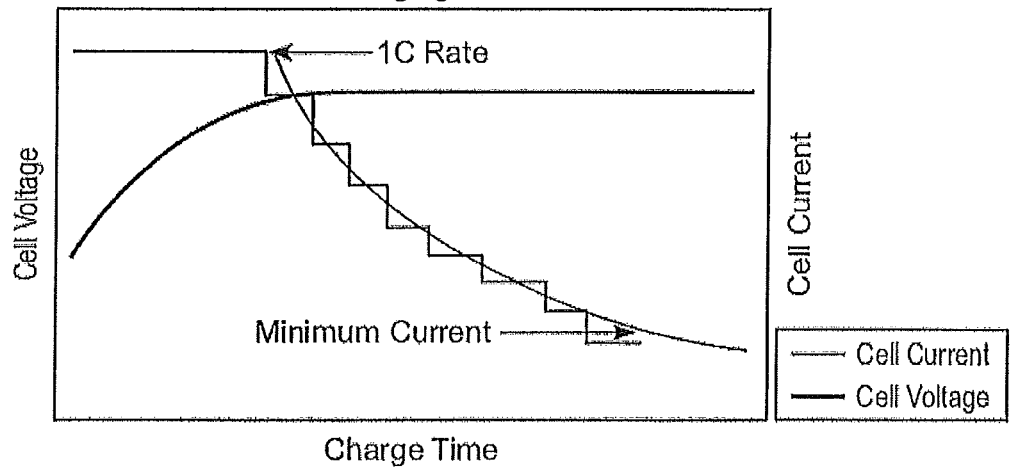
FIG. 10 is a comparison of the charging current of slow control charging to normal charging.

FIG. 10 is a comparison of the charging current during slow control charging. In particular, the stepped line describes the operation of the slow control algorithm for charging the battery, as compared with optimal charging of the battery (e.g., the smooth curve portion of the graph).

Figure 11:
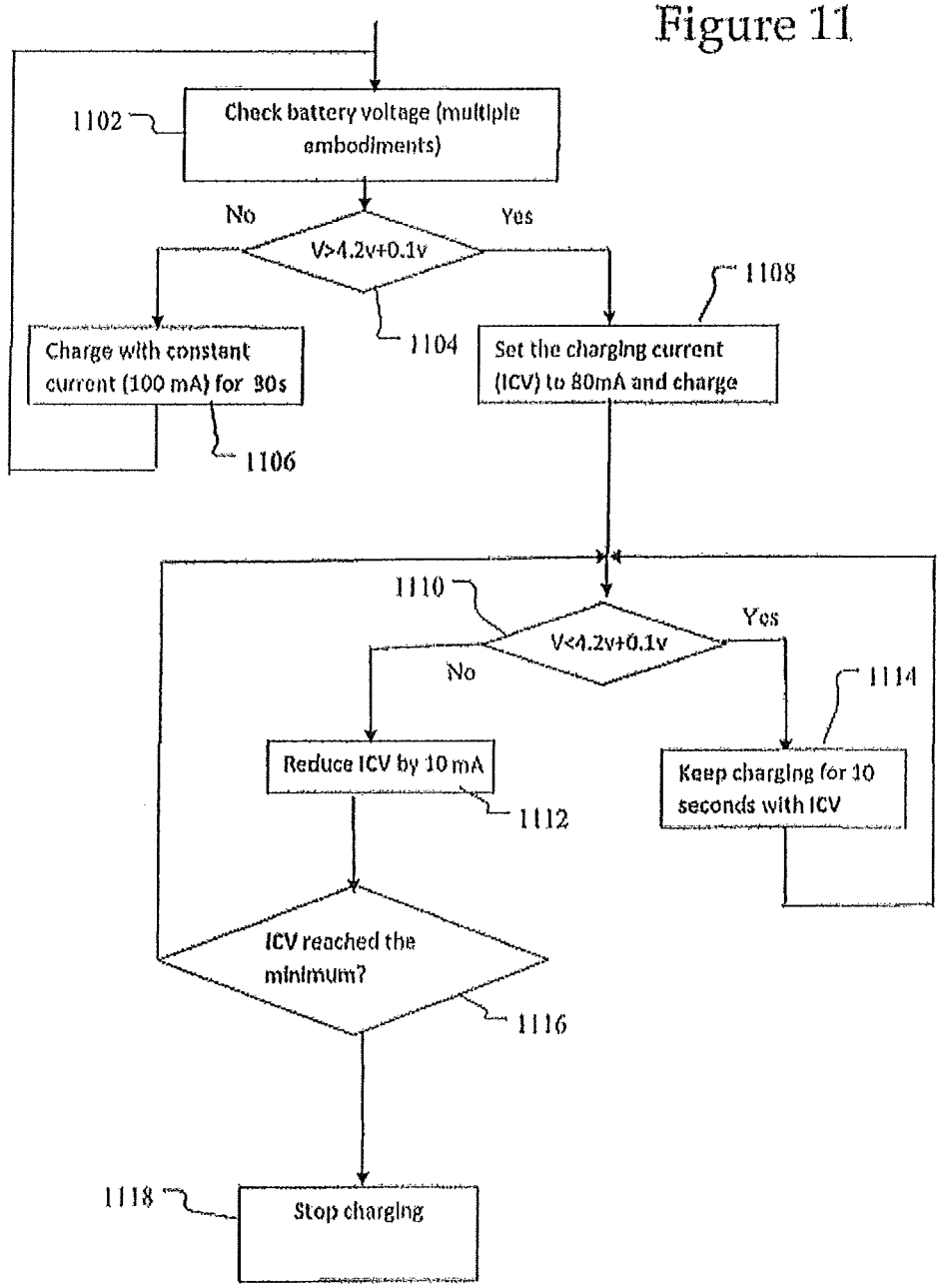
FIG. 11 is a flow chart for an exemplary slow control algorithm.

FIG. 11 is a flow chart for an exemplary algorithm. In particular, FIG. 11 illustrates one embodiment for a 4.2V lithium ion battery with a difference of 0.1 V between the internal battery voltage and the outside connectors of the e-Cig with a charging current maximum of 100 mA. In block 1102, the battery voltage may be checked according to one of the embodiments described herein. If the voltage is less than 4.2V+0.1V in block 1104, then a constant current (100 mA for 30 seconds) is provided for charging the battery, in block 1106. If the voltage is greater than 4.2V+0.1V in block 1104, then the charging current is set to 80 mA for 10 seconds in block 1108. In block 1110, the same voltage comparison is made. When the voltage exceeds 4.2V+0.1V, then the charging current is reduced by 10 mA in block 1112. When the charging current is reduced to the minimum current in block 1116, then charging may be stopped in block 1118. When the voltage comparison is less than 4.2V+0.1V, then the charging current is maintained for 10 seconds, in block 1114. The values illustrated in FIG. 11 and described herein are merely exemplary. The period for testing the battery voltage when providing constant current, during steps 1102, 1104, and 1106, may be 30 seconds, as indicated in FIG. 7. The period during the constant voltage part of the charging, during block 1110, may be smaller. For example, 10 seconds and may be adapted to the charging current reduction rate, as indicated in FIG. 10 to achieve improved accuracy. Alternative amounts, times, and comparisons can be made in other embodiments. FIG. 11 is merely one example of a charging algorithm.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. A method of making a circuit for an e-vaping device, the method comprising:
   operatively connecting an internal circuitry to a first battery to assist in charging the first battery, the first battery having a first terminal and a second terminal;
   electrically connecting a pair of connectors to the e-vaping device;
   electrically connecting a diode to the first terminal and a first connector, of the pair of connectors, the diode being in a bypass line that bypasses the internal circuitry; and
   configuring a controller to
      measure a first measured voltage at the pair of connectors during an application of a first current, the first current being high enough that the first current passes through the diode and being low enough that the first current does not activate the internal circuitry, and
      determine a voltage of the first battery based on the first measured voltage.

2. The method of claim 1, further comprising:
   configuring a cartridge to receive power from the first battery.

3. The method of claim 2, wherein the cartridge is disposable.

4. The method of claim 2, wherein the cartridge is interchangeable with, and configured to be charged by other batteries that have battery properties that are different than the first battery.

5. The method of claim 4, wherein the battery properties include an internal voltage, a charging current, or combinations thereof.

6. The method of claim 1, further comprising:
   arranging a heating element within a cartridge to receive power from the first battery; and
   configuring the heating element to generate a vapor by heating a liquid that is stored within the cartridge.

7. The method of claim 1, wherein the configuring further configures the controller to:
   enable charging of the first battery with a second current applied across the pair of connectors, during a first charging stage, while measuring, periodically, a second measured voltage at the pair of connectors during a first time period to obtain a second measured voltage, wherein the second current remains constant during the first charging stage.

8. The method of claim 7, wherein the second current is a maximum current that is used to charge the first battery.

9. The method of claim 7, wherein the configuring further configures the controller to:
   determine whether the second measured voltage is greater than a reference voltage,
   reduce the second current by a first amount, to charge the first battery using a third current applied across the pair of connectors during a second charging stage, when the second measured voltage is greater than the reference voltage,
   measure, periodically, a third measured voltage at the pair of connectors during a second time period.

10. The method of claim 9, wherein the second current is larger than the third current.

11. The method of claim 9, wherein the configuring further configures the controller to:
   reduce the third current by a second amount, to charge the first battery using a reduced current, each time the third measured voltage is greater than the reference voltage, and
   stop the charging of the first battery when the reduced current is reduced to a reference current.

12. The method of claim 11, wherein the second current is larger than the third current, the reduced current and the reference current.

13. The method of claim 9, wherein the second current is a maximum current that is used to charge the first battery.

14. The method of claim 9, wherein a forward voltage of the diode is not impacted by environmental temperature changes during the application of the first current.

15. The method of claim 1, wherein the configuring further configures the controller to determine the voltage of the first battery by:
- subtracting a forward voltage of the diode from the first measured voltage to calculate the voltage of the first battery.

16. The method of claim 1, wherein a forward voltage of the diode is not impacted by environmental temperature changes during the application of the first current.

\* \* \* \* \*